United States Patent [19]
Kugell

[11] Patent Number: 6,111,940
[45] Date of Patent: Aug. 29, 2000

[54] METHOD FOR PROVIDING TELEPHONIC SERVICES

[75] Inventor: Stanley Kugell, Chestnut Hill, Mass.

[73] Assignee: Pilgrim Telephone, Inc., Cambridge, Mass.

[21] Appl. No.: 09/189,366

[22] Filed: Nov. 9, 1998

[51] Int. Cl.[7] ...................................................... H04M 3/42
[52] U.S. Cl. ........................ 379/201; 379/88.19; 379/213
[58] Field of Search .................... 379/142, 209, 379/245, 258, 265, 88.22, 88.23, 88.24, 88.25, 88.26, 201, 202, 213, 111, 114, 88.19, 88.2, 88.21

[56] References Cited

U.S. PATENT DOCUMENTS

| | | | |
|---|---|---|---|
| 4,996,705 | 2/1991 | Entenmann et al. ...................... | 379/91 |
| 5,311,574 | 5/1994 | Livanos .................................... | 379/209 |
| 5,333,180 | 7/1994 | Brown et al. ......................... | 379/88.06 |
| 5,418,844 | 5/1995 | Morrisey et al. ....................... | 379/207 |
| 5,740,229 | 4/1998 | Hanson et al. .......................... | 379/209 |
| 5,943,397 | 8/1999 | Gabin et al. ........................ | 379/213 X |

*Primary Examiner*—Scott L. Weaver
*Attorney, Agent, or Firm*—Chadbourne & Parke LLP

[57] ABSTRACT

A method for providing telephonic services comprises providing a toll-free access telephone number and receiving signaling or a call made to the toll-free number by a customer. The calling number of the customer number is determined and the signaling is terminated or the call is hung up. Thereafter, the customer is called-back and provided with a dialing prompt whereby the customer can select a desired service.

66 Claims, 4 Drawing Sheets

METHOD FOR PROVIDING TELEPHONIC SERVICES

BACKGROUND OF THE INVENTION

The present invention relates to a method of providing telephonic services, and in particular, to providing access by a customer to long-distance carriers and information providers and to prompted dialing services. The term "service provider" will henceforth be used to refer to both long-distance service providers and information providers.

There presently exist several methods of accessing a long-distance carrier. One method is the pre-subscription method. In this method, every telephone line has a pre-subscribed long-distance carrier. To use the pre-subscribed carrier, the customer dials 1+the area (or service) code plus seven more digits. This is known as "1+" dialing.

A second method is the use of a CIC (carrier identification code) code. In this method, every carrier has a unique 4-digit CIC code. To reach a desired carrier by means of a CIC code, the customer dials "101" +the CIC code. This enables the customer to use that carrier for a call by dialing 101+CIC code+1+area code, etc.

Another method of accessing a long-distance carrier is the use of a calling card. The customer dials a toll-free number belonging to the desired carrier and charges a call to a calling card or a credit card.

A further method of accessing a long-distance carrier is the use of a collect call. The customer dials a toll-free number belonging to the desired carrier and places a collect call using that carrier.

Similarly, several methods exist of accessing an information provider, including dialing a "900" (or intra-area code equivalent) service code number, dialing an "800" service code number, and dialing a POTS number, including both local and long-distance numbers.

SUMMARY OF THE INVENTION

The object of the present invention is to provide an improved method of accessing service providers for providing telephonic services.

This and other objects of the present invention are achieved in accordance with the present invention wherein a customer calls a toll-free number, hangs up, and is called back by the selected service provider, which then gives the customer a dial tone or other indication that input is expected from the customer. Although a dial-tone is the most common form of an indication to the customer that input is expected, there are other such indications, such as a single tone, and verbal prompts. The term "dialing prompt" will henceforth be used to refer to all forms of indications that input is expected from the customer, including, conventional dial-tone, conventional single tones, conventional verbal prompts, and the improved method of verbal prompts described below.

Typically, the use of a dial-tone means that the customer is to input a destination telephone number, and the use of a single tone means that the customer is to input some other type of information, such as a billing number. The use of verbal prompts has been used to verbally tell the customer which type of information to enter. Under the method of the present invention, a new use of verbal prompts is possible, namely, using prompts to advise the caller from time to time during entry of a dialing sequence exactly where the customer is in that sequence, or what entry a customer must make to complete a call to a desired location or service, or to indicate to the customer that there may have been an entry error. The method of the present invention is known as "Call-Back Dial-Tone", and the method of providing prompted dialing is known as "Prompted Dialing".

In accordance with the object of the present invention, the present invention also includes a method for providing telephonic services wherein an access telephone number is provided corresponding to a provider of telephonic services, signaling made to the access number by the customer is received by the provider, a desired dialing sequence to be inputted by the customer is determined, and a prompt of at least one but fewer than all of the digits of the desired dialing sequence is provided to the customer. Prompting is repeated until the dialing sequence is completed by the customer. The desired dialing sequence can be a telephone number, a geographic area code telephone number or a service code telephone number, such as a "900" number, or a dialing code selected from a menu. The prompting can be one which allows a touch-tone input, a dialing input or a verbal input. In accordance with a preferred embodiment of the present invention, the prompted dialing can be used in conjunction with callback, wherein the customer is called back before the desired dialing sequence is determined. Alternatively, the customer is called back after determining the desired dialing sequence.

In a typical embodiment of the present invention, a person connects to a telephonic menu or information service from which the caller is given a number to call to reach the desired service. For example, the number can be 1+900+XXX-XXXX, although it could be a regular area code or local number. Since many people cannot remember ten digits, the caller can acknowledge that prompting is desired by an appropriate input from the telephone instrument, by giving a verbal response, or by merely continuing with the process, so that the system can help the person dial by repeating a few digits at a time as the person inputs the number. On a call-back, the person calls, gets a menu, selects the number he or she wants to reach, hangs up and gets called back, and there is a voice at the other end which says, for example, "this is the call-back you requested. You indicated that you wish to reach 900-123-4567. If you wish to reach that number, please dial 1-900 now. If you do not wish to reach that number, please dial or say 5 now." After the input, or after a time out, the prompt continues and says, for example, "now please dial 123." This is repeated until the entire dialing sequence is completed. This method allows for error correction, because if the caller does dial the 1-900 but hits 126, the system can detect that and respond accordingly.

From the dialing prompt, the customer can obtain basic telephonic services (e.g., long distance), enhanced services (e.g., speed dialing), or audio services (e.g., entertainment or information provided by information providers). The method of the present invention is the only method whereby a customer can obtain a general dial-tone (i.e., a dial-tone equivalent to the dial-tone provided by a local exchange carrier (LEC) from a long-distance carrier.

The present invention has many advantages for customers and service providers. It allows small long-distance carriers, for example, those that are not facilities-based and therefore not able to become pre-subscribed, or reachable by 101+ (CIC code), or have traffic delivered by "0" operators, to compete nationally with large long-distance carriers for long-distance traffic.

The present invention also allows all service providers to compete nationally with large long-distance carriers for "900" traffic. Carriers without the facilities to carry their own "900" traffic must pay high rates to facilities-based carriers to carry "900" traffic.

The method according to the present invention also allows long-distance carriers to lower their costs with respect to their long-distance traffic. In the conventional "1+" call, the long-distance carrier pays both the originating and terminating local exchange carriers (LECs) for handling the call. In the present invention, the long-distance carrier can eliminate the payment to the originating LEC.

The present invention allows fraud control for calls to numbers to which the customer is able to block calling, such as "900" numbers. The reason is that the calling back identifies the calling phone as one to which direct calls can be made, thereby eliminating many of the telephones from which fraudulent long-distance and "900" calls are made, for example, PBX's and pay phones. In addition, although the LECs make available databases of blocked numbers, the databases have errors, and a supposedly blocked call can get through. In such a case, the long-distance carrier and the information provider may incur losses.

The facilities-based carriers that carry the traffic for the small long-distance companies charge the small long-distance carriers more for carrying an incoming call (for example, an "800" call) than for carrying an outgoing "1+" call. Therefore, overall, it is less expensive for the small long-distance carrier to pay for the initial, short "800" call in, the long "1+" call to the customer and the long "1+" call out to the recipient of the customer's call, than to pay for a long "800" call in and a long "1+" call out to the recipient of the customer's call, which would be the case if the customer made the call by the calling card or credit card method.

The method also allows a long-distance carrier to allocate the entire universe of telephone numbers as it sees fit. This is because once a customer is connected to a carrier, a carrier can carry a call however it wishes. Thus, a carrier can use some unused portion of the North American Numbering Plan (NANP) phone spectrum (e.g., the 666 service code) to allow its customers to advertise easily remembered numbers. Thus, even though 1-800-FLOWERS is taken, with the present invention, a carrier could offer 1-666-FLOWERS and thousands of other memorable numbers.

The method according to the present invention also allows a long-distance carrier to offer all services that a LEC can offer. Examples of such services that could be offered include: speed dialing (e.g., the customer entering a digit or two to reach a specific 10-digit number); other abbreviated dialing patterns; specialized dialing patterns (e.g., the customer entering a specific code presents the customer with a specialized menu of options); scheduled calls (e.g., the customer is called back by the long-distance company at a scheduled time); vertical service (also known as CLASS service and as * and # feature) codes (e.g., the customer entering *66 for repeat dialing, or *67 for caller ID blocking); voice-activated dialing (e.g., the customer speaks the digits of the phone number, or the name of the party, desired to be called); Directory Assistance (with or without call completion); Operator assistance; prompted dialing (e.g., a number returned from Directory Assistance, an information service, or a menu selection is repeated to the customer in units of only a few digits as the customer enters them for calling); selection of billing methods; entertainment services (e.g., "psychic readings"), information services (e.g., sports scores, lottery results); 900 services; multi-party calling; conference calling; and telemessaging. Depending upon the nature of the service offering, it can be selected by the customer during the incoming call to the provider or during the return call to the customer. For example, the option to be called-back at a number other than the number from which the call was placed would have to be selected during the incoming call, but the option to bill the call to a credit card could be selected during either the incoming call or the call-back.

The present invention gives a customer more flexibility than may be offered by the customer's LEC. For example, at present, a customer cannot easily block and unblock "900" calls with a LEC, but with the present invention, the customer could block "900" calls with a LEC and still make a "900" number call if the customer so chose. Thus, the house phone could be blocked for "900" calls by the children, but the parents could still make "900" calls.

The method of the present invention is distinguished from a method known as "International Call-Back" which is used extensively overseas. In the "International Call-Back" method, an overseas customer signs up for the service and is assigned a regular, non-800 telephone number in the United States. When the customer calls from overseas to the assigned United States telephone number, the telephone is not answered in order to avoid any charges for the call, but the equipment in the United States calls the customer back at a pre-arranged telephone number overseas and gives the customer a dial-tone. The foreign customer can then make a call to another place via the United States equipment. The reason for this method is that it is cheaper to call, for example, England from France, by using this method based upon United States rates, than by dialing England directly from France based upon French rates. The system is used overseas because of the economics.

With regard to International Call-Back, it is set up for each customer with a one-to-one correspondence between a particular overseas telephone number and a particular U.S. telephone number, and therefore, the customer has to use International Call-Back from that originating phone. The present invention, by contrast, because the long-distance company recognizes the calling telephone number through Automatic Number Identification (ANI), allows the customer to call from any billable phone that can be called back. Thus, the system of the present invention can be used without any prior arrangement, from any billable telephone, whereas International Call-Back cannot.

Because International Call-Back has a unique U.S. number assigned to each customer, the system's access number cannot be advertised directly. The present invention, by contrast, allows the same call-in number to be used by all customers, thereby allowing advertising of the access number.

Similarly, different access numbers can be used to offer different sets of services, thereby making it possible to tailor advertising to the market for such services. Specialized access numbers also can be used to tailor the options for a particular caller, such as to offer a small number of call-back numbers from which the customer can select with a simple entry (rather than, for example, having to enter a full-length telephone number), or to offer a limited number of service options which similarly can be easily selected.

International Call-Back always calls back the pre-arranged number. In the present invention, by contrast, the initial call can be answered, a menu of options can be presented to the caller, such as being called back at a user-specified number rather than at the number calling in, or calling back at a later time rather than immediately. In this last case, the call-back could be made for purposes of allowing the customer to make an outgoing call, or to receive entertainment or information services, or could be made for other purposes, such as a wake-up call, or a reminder, or to activate some device appropriately connected to the telephone instrument. Thus, under the method of the present invention, there is no need (as there is under the method of International Call-Back) for the customer to remember which telephone number is registered for the service, or which number needs to be called from which telephone.

In another embodiment of the present invention, the method for providing telephone service comprises providing a toll-free access telephone number corresponding to the service provider and not corresponding to any customer or customer telephone number and which is thereby usable by any valid customer. The method also includes receiving signaling made to the toll-free number by a customer from a calling number, determining the calling number and terminating the signaling. The calling number is called back and the customer is provided with a dialing prompt whereby the customer can select a desired service. Services include conventional long-distance calling (e.g., 1+area code+7 digits (and foreign equivalents)), conventional service code calling (e.g., "800" and "900" numbers), and the calling of numbers which reach information providers providing entertainment or information services (e.g., individual audio text services, multi-party audio text services, multi-party connection).

The dialing prompt provided to the customer can be either a dial-tone or a verbal prompt, and can preferably have any number of services automatically available, or, a menu of services can be provided to the customer for selection of the desired one or ones to be used. The services could include speed dialing, other abbreviated dialing patterns, specialized dialing patterns, vertical service codes, voice-activated dialing, Directory Assistance, Operator assistance, prompted dialing, selection of billing methods, entertainment services, information services, 900 services, multi-party calling, conference calling and telemessaging.

In a further embodiment of the present invention, the method comprises providing a toll-free access telephone number corresponding to the service provider and not corresponding to any customer or customer telephone number and which is thereby usable by any valid customer. The method also includes receiving a call made to the toll-free number by a customer from a calling number, providing call-back options to the customer, receiving an indication of at least one call-back option from the customer and hanging up the call. The customer is then called back in accordance with the at least one call-back option.

In a still further embodiment, the customer is provided with a dialing prompt, whereby the customer can select a desired service. Services include conventional long-distance calling (e.g., 1+area code+7 digits (and foreign equivalents)), conventional service code calling (e.g., "800" and "900" numbers), and the calling of numbers which reach information providers providing entertainment or information services (e.g., individual audio text services, multi-party audio text services, multi-party connection). The dialing prompt provided to the customer can be either a dial-tone or a verbal prompt, and can preferably have any number of services automatically available, or, a menu of services can be provided to the customer for selection of the desired one or ones to be used. The services could include speed dialing, other abbreviated dialing patterns, specialized dialing patterns, vertical service codes, voice-activated dialing, Directory Assistance, Operator Assistance, prompted dialing, selection of billing methods, entertainment services, information services, 900 services, multi-party calling, conference calling and telemessaging.

These and other features and advantages of the present invention are achieved in accordance with the present invention described in more detail hereinafter with regard to the attached drawings, wherein,

DETAILED DESCRIPTION OF THE INVENTION

Figure 1:
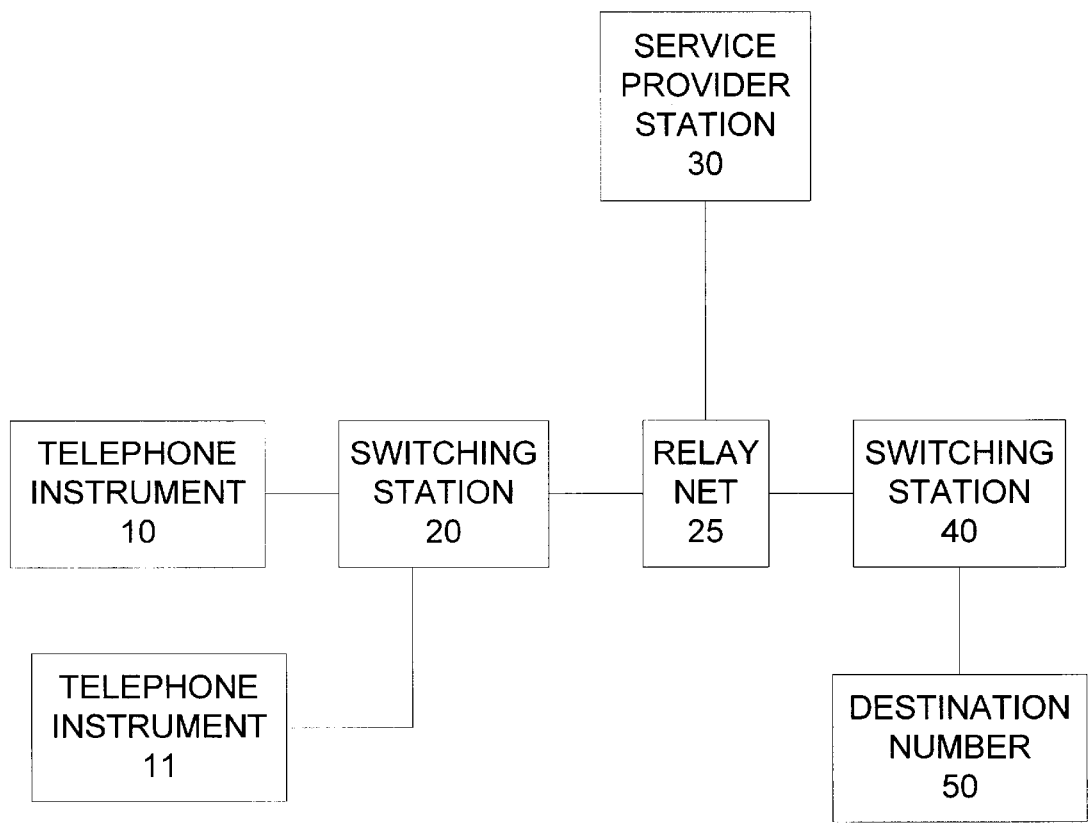
FIG. 1 is a block diagram of a system for carrying out the method according to the present invention.

The methods according to present invention can be carried out using the equipment shown in FIG. 1. In FIG. 1, a switching station 20 services multiple telephone instruments, including instruments 10 and 11 shown therein. The switching station 20 is connected through the relay net 25 to a switching station 40 which services a destination number 50. The service provider station 30 is connected to the relay net 25.

Figure 2:
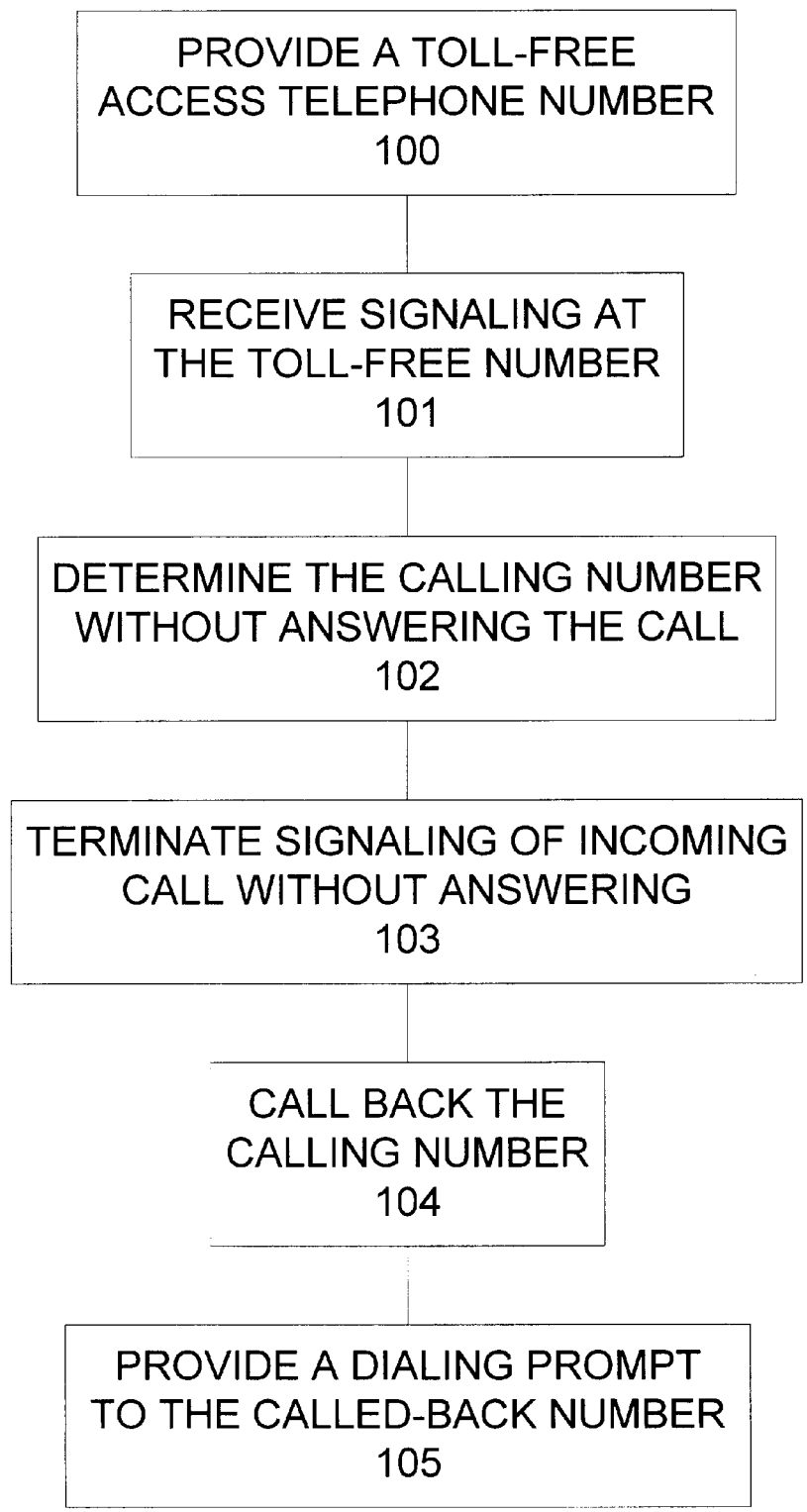
FIG. 2 is a flow chart of one method according to the present invention.

Referring to FIG. 2, in accordance with the present invention a service provider having switching station 30 provides a toll-free access telephone number in step 100. A customer at telephone instrument 10 dials the toll-free number and switching station 20 sends a calling signal through the relay net 25 to the service provider station 30, thus receiving signaling at the toll-free number in step 101.

The service provider determines the calling number of telephone instrument 10 in step 102 without answering the call by use of ANI or other conventional techniques. In step 103, the service provider terminates the incoming signaling without answering the call. The service provider station 30 then calls back the calling number of telephone instrument 10 in step 104 and provides a dialing prompt to the called-back number in step 105.

Using this dialing prompt, the caller at telephone instrument 10 can now dial the destination number 50 through the service provider station 30, if the service provider is a long-distance carrier, or can select an information or entertainment service from those offered by the service provider itself if the service provider is an information provider, rather than a long-distance carrier.

Figure 3:
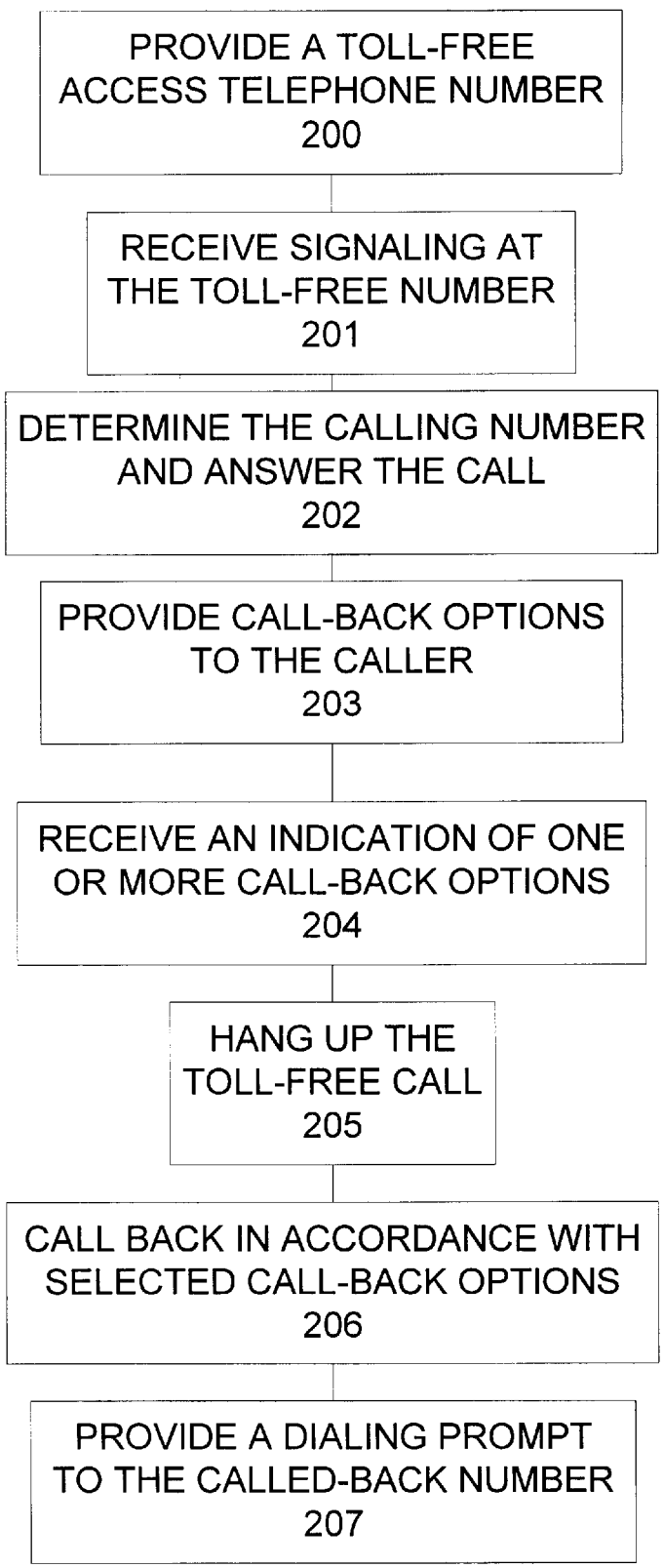
FIG. 3 is a flow chart of an alternative method according to the present invention.

In an alternative embodiment of the present invention shown by the flow chart of FIG. 3, a toll-free access telephone number is provided in step 200 and the service provider station receives a call to the toll-free number in step 201. In this embodiment, the service provider determines the calling number of telephone instrument 10 by ANI or other conventional techniques and answers the call in step 202. In step 203, the caller is given a number of call-back options. For example, the caller is given the option of having the call-back to another telephone instrument, for example, telephone instrument 11 which may be in another portion of the home or may be a cell phone or an office phone. Alternatively, the call-back options can be to call-back either telephone instrument 10 or telephone instrument 11 at a designated time. The customer responds to the menu options by pressing keys on the telephone instrument in step 204, or alternatively, speaking them if voice recognition capability is available. For example, the customer can indicate whether it is the calling number that should be called back or some other number. The call-back options may include any number of options, such as those discussed above, or others such as use of a security code to authorize which area and service codes, or information services, may be dialed from the dialing prompt or selecting a method for charging the call (e.g., to the destination number or to a credit card).

After receiving the indication of one or more call-back options, the toll-free call is hung up in step 205 and the call-back is made in accordance with the selected call-back options in step 206. A dialing prompt is provided to the called-back number in step 207.

Figure 4:
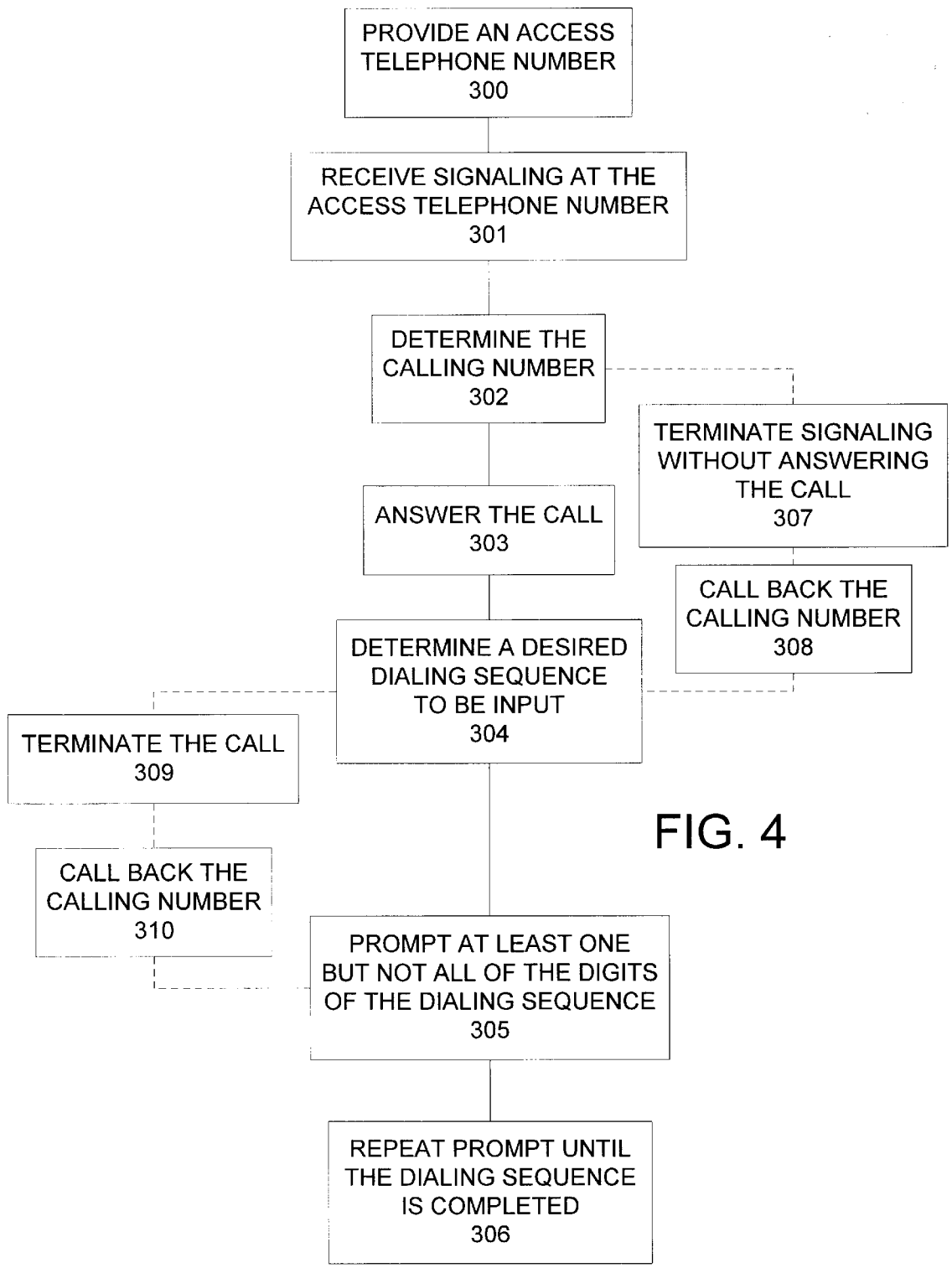
FIG. 4 is a flow chart of a prompted dialing method according to the invention.

FIG. 4 shows a method of providing a prompted dialing telephonic service.

In step 300, the service provider provides an access telephone number at the service provider station and receives signaling at the access telephone number in step 301 from a telephone instrument 10 or 11. In step 302, the service provider determines the calling number by the methods set forth earlier, and in step 303, the service provider answers the call.

In step 304, a desired dialing sequence to be input is determined, for example, a destination number 50. This number could be determined, for example, by an inquiry to directory assistance, or by a selection from a menu. In step 305, the customer is prompted to dial at least one, but not all of the digits of the dialing sequence. For example, the customer can be prompted to dial three digits at a time. In step 306, the prompting is repeated until the dialing sequence is completed. The customer can be prompted to input the digits of the dialing sequence via a touch-tone input, a dialing input or a verbal input. Moreover, the desired dialing sequence can be a telephone number, a geographic area code telephone number, or a service code number such as a "900" number, or a dialing code selected from a menu.

The method can also include error correction for the prompted dialing. Because the selected input is already known to the service provider, if the customer's actual input fails to match the expected input, the customer can be prompted with respect to this discrepancy to determine whether the customer made an input error or decided to enter an input other than that previously determined.

The method of FIG. 4 can also be carried out using a call-back telephonic service, and the call-back can be made either before or after the determination of the dialing sequence.

In the case where the call-back is made before the determination of the dialing sequence, as shown in FIG. 4, after the signaling is received at the access telephone number in step 301, and the calling number determined in step 302, the signaling is terminated without answering the call in step 307 and the service provider calls back the calling number is step 308. Thereafter, the desired dialing sequence is determined in step 304, and steps 305 an d 306 follow as above.

In the case where the call-back is made after the determination of the dialing sequence, as shown in FIG. 4, after the signaling is received at the access telephone number in step 301, the calling number determined in step 302, the call answered in step 303, and the desired dialing sequence determined in step 304, the call is terminated in step 309, followed by the calling back of the calling number in step 310. Thereafter, the prompting of the digits begins in step 305.

The method of FIG. 4 also can be carried out in conjunction with the method of FIG. 2 or 3, such that, for example, the call-back step 310 is made to a number other than the calling number.

It is understood that the embodiments described hereinabove are merely illustrative and are not intended to limit the scope of the invention. It is realized that various changes alterations, rearrangements and modifications can be made by those skilled in the art without substantially departing from the spirit and scope of the present invention.

What is claimed is:

1. A method for providing telephonic services, comprising the steps of:
   providing a toll-free access telephone number corresponding to the provider and not corresponding to any customer or customer telephone number and thereby usable by any valid customer;
   receiving signaling made to the toll-free number by a customer from a calling number;
   determining the calling number;
   terminating the signaling;
   calling back the calling number; and
   providing the customer with a dialing prompt, whereby the customer can select a desired telephonic service.

2. The method according to claim 1, wherein the dialing prompt is a dial-tone.

3. The method according to claim 1, wherein the dialing prompt is a verbal prompt.

4. The method according to claim 3, wherein the verbal prompt comprises a menu of telephonic services.

5. The method according to claim 1, wherein the step of providing a dialing prompt comprises providing the customer with a dialing prompt with speed dialing service.

6. The method according to claim 1, wherein the step of providing a dialing prompt comprises providing the customer with a dialing prompt with multi-party calling service.

7. The method according to claim 6, wherein the multi-party calling service comprises conference calling service.

8. The method according to claim 1, wherein the step of providing a dialing prompt comprises providing the customer with a dialing prompt with abbreviated dialing patterns.

9. The method according to claim 1, wherein the step of providing a dialing prompt comprises providing the customer with a dialing prompt with specialized dialing patterns.

10. The method according to claim 1, wherein the step of providing a dialing prompt comprises providing the customer with a dialing prompt with vertical service code service.

11. The method according to claim 1, wherein the step of providing a dialing prompt comprises providing the customer with a dialing prompt with voice activated dialing service.

12. The method according to claim 1, wherein the step of providing a dialing prompt comprises providing the customer with a dialing prompt with directory assistance service.

13. The method according to claim 1, wherein the step of providing a dialing prompt comprises providing the customer with a dialing prompt with operator assistance service.

14. The method according to claim 1, wherein the step of providing a dialing prompt comprises providing the customer with a dialing prompt with prompted dialing service.

15. The method according to claim 1, wherein the step of providing a dialing prompt comprises providing the customer with a dialing prompt with information service.

16. The method according to claim 1, wherein the step of providing a dialing prompt comprises providing the customer with a dialing prompt with 900 service.

17. The method according to claim 1, wherein the step of providing a dialing prompt comprises providing the customer with a dialing prompt with telemessaging service.

18. The method according to claim 1, wherein the provider of telephonic services is a long-distance carrier.

19. The method according to claim 1, wherein the provider of telephonic services is an information provider.

20. A method of providing telephonic services, comprising the steps of:

provide a toll-free access telephone number corresponding to the provider and not corresponding to any customer or customer telephone number and thereby usable by any valid customer;

receiving a call made to the toll-free number by a customer from a calling number;

providing call-back options to the customer;

receiving an indication of at least one call-back option from the customer;

terminating the call;

calling back the customer in accordance with the at least one call-back option; and providing the customer with a dialing prompt after the step of calling back, whereby the customer can select a desired telephonic service.

21. The method according to claim 20, wherein the dialing prompt is a dial-tone.

22. The method according to claim 20, wherein the dialing prompt is a verbal prompt.

23. The method according to claim 22, wherein the verbal prompt comprises a menu of telephonic services.

24. The method according to claim 20, wherein the call-back options include calling back a telephone number other than the one from which the toll-free access number was called.

25. The method according to claim 20, wherein the call-back options include calling back at a designated time.

26. The method according to claim 20, wherein the call-back options include use of a security code to authorize which services may be dialed from the dialing prompt.

27. The method according to claim 20, wherein the call-back options include selecting a method of charging for a call made to a destination number.

28. The method according to claim 20, wherein the step of providing a dialing prompt comprises providing the customer with a dialing prompt with speed dialing service.

29. The method according to claim 20, wherein the step of providing a dialing prompt comprises providing the customer with a dialing prompt with multi-party calling service.

30. The method according to claim 29, wherein the multi-party calling service comprises conference calling service.

31. The method according to claim 20, wherein the step of providing a dialing prompt comprises providing the customer with a dialing prompt with abbreviated dialing patterns.

32. The method according to claim 20, wherein the step of providing a dialing prompt comprises providing the customer with a dialing prompt with specialized dialing patterns.

33. The method according to claim 20, wherein the step of providing a dialing prompt comprises providing the customer with a dialing prompt with vertical service code service.

34. The method according to claim 20, wherein the step of providing a dialing prompt comprises providing the customer with a dialing prompt with voice activated dialing service.

35. The method according to claim 20, wherein the step of providing a dialing prompt comprises providing the customer with a dialing prompt with directory assistance service.

36. The method according to claim 20, wherein the step of providing a dialing prompt comprises providing the customer with a dialing prompt with operator assistance service.

37. The method according to claim 20, wherein the step of providing a dialing prompt comprises providing the customer with a dialing prompt with prompted dialing service.

38. The method according to claim 20, wherein the step of providing a dialing prompt comprises providing the customer with a dialing prompt with information service.

39. The method according to claim 20, wherein the step of providing a dialing prompt comprises providing the customer with a dialing prompt with 900 service.

40. The method according to claim 20, wherein the step of providing a dialing prompt comprises providing the customer with a dialing prompt with telemessaging service.

41. The method according to claim 20, wherein the provider of telephonic services is a long-distance carrier.

42. The method according to claim 20, wherein the provider of telephonic services is an information provider.

43. A method for providing telephonic services, comprising the steps of:

providing an access telephone number corresponding to a provider of telephonic services;

receiving signaling made to the access telephone number by a customer;

determining a desired dialing sequence to be inputted by the customer;

providing a prompt of at least one and less than all digits of the desired dialing sequence to the customer;

repeating with at least one additional prompt until the dialing sequence is completed by the customer; and determining a calling telephone of the customer and calling back the calling number before determining the desired dialing sequence.

44. The method according to claim 43, wherein the desired dialing sequence is a telephone number.

45. The method according to claim 44, wherein the desired dialing sequence is a geographic area code telephone number.

46. The method according to claim 44, wherein the desired dialing sequence is a service code telephone number.

47. The method according to claim 46, wherein the desired dialing sequence is a 900 service code telephone number.

48. The method according to claim 43, wherein the step of providing a prompt comprises prompting a touch tone input.

49. The method according to claim 43, wherein the step of providing a prompt comprises prompting a dialing input.

50. The method according to claim 43, wherein the step of providing a prompt comprises prompting a verbal input.

51. The method according to claim 43, wherein the desired dialing sequence is a 900 service code telephone number.

52. The method according to claim 43, wherein the provider of telephonic services is a long-distance carrier.

53. The method according to claim 43, wherein the provider of telephonic services is an information provider.

54. The method according to claim 43, further comprising providing error correcting prompting for incorrect inputs from the customer.

55. A method for providing telephonic services, comprising the steps of:
   providing an access telephone number corresponding to a provider of telephonic services;
   receiving signaling made to the access telephone number by a customer;
   determining a desired dialing sequence to be inputted by the customer;
   providing a prompt of at least one and less than all digits of the desired dialing sequence to the customer;
   repeating with at least one additional prompt until the dialing sequence is completed by the customer; and
   determining a calling telephone of the customer and calling back the calling number after determining the desired dialing sequence and before providing the prompt.

56. The method according to claim 55, wherein the desired dialing sequence is a 900 service code telephone number.

57. The method according to claim 54, wherein the desired dialing sequence is a telephone number.

58. The method according to claim 57, wherein the desired dialing sequence is a geographical area code telephone number.

59. The method according to claim 57, wherein the desired dialing sequence is a service code telephone number.

60. The method according to claim 59, wherein the desired dialing sequence is a 900 service code telephone number.

61. The method according to claim 55, wherein the step of providing a prompt comprises prompting a touch tone input.

62. The method according to claim 55, wherein the step of providing a prompt comprises prompting a dialing input.

63. The method according to claim 55, wherein the step of providing a prompt comprises prompting a verbal input.

64. The method according to claim 55, wherein the provider of telephonic services is a long-distance carrier.

65. The method according to claim 55, wherein the provider of telephonic services is an information provider.

66. The method according to claim 55, further comprising providing error correcting prompting for incorrect inputs from the customer.

* * * * *

UNITED STATES PATENT AND TRADEMARK OFFICE
CERTIFICATE OF CORRECTION

PATENT NO.   : 6,111,940
DATED        : August 29, 2000
INVENTOR(S)  : Kugell

It is certified that error appears in the above-identified patent and that said Letters Patent is hereby corrected as shown below:

Column 8,
Line 15, remove "the provider" and add -- a provider of telephonic services --.

Column 9,
Line 14, remove "the provider" and add -- a provider of telephonic services --.

Column 10,
Line 42, insert -- number -- after "telephone".

Column 11,
Line 18, insert -- number -- after "telephone".

Signed and Sealed this

Tenth Day of June, 2003

JAMES E. ROGAN
*Director of the United States Patent and Trademark Office*